United States Patent [19]

Turner

[11] Patent Number: 4,581,641

[45] Date of Patent: Apr. 8, 1986

[54] VIDEO NOISE DETECTOR

[75] Inventor: Rudolf Turner, Vernon Hills, Ill.

[73] Assignee: Zenith Electronics Corporation, Glenview, Ill.

[21] Appl. No.: 662,198

[22] Filed: Oct. 18, 1984

[51] Int. Cl.⁴ .................. H04N 5/213; H04N 5/14; H04N 5/08; H04N 9/64
[52] U.S. Cl. .................. 358/167; 358/166; 358/155; 358/36
[58] Field of Search .................. 358/167, 166, 36, 155

[56] References Cited

U.S. PATENT DOCUMENTS 3,814,855  6/1974  Kokado .................. 358/155 X

Primary Examiner—Michael A. Masinick
Assistant Examiner—E. Anne Toth

[57] ABSTRACT

Noise in a composite video signal is detected by looking for the presence of excessive pulses resembling broad pulses or insufficient horizontal sync pulses. The output of the detector is averaged by a low pass filter, the output of which is, in turn, applied to a comparator for comparison with a reference DC level in generating a signal representing the noise level in the composite video signal.

9 Claims, 13 Drawing Figures

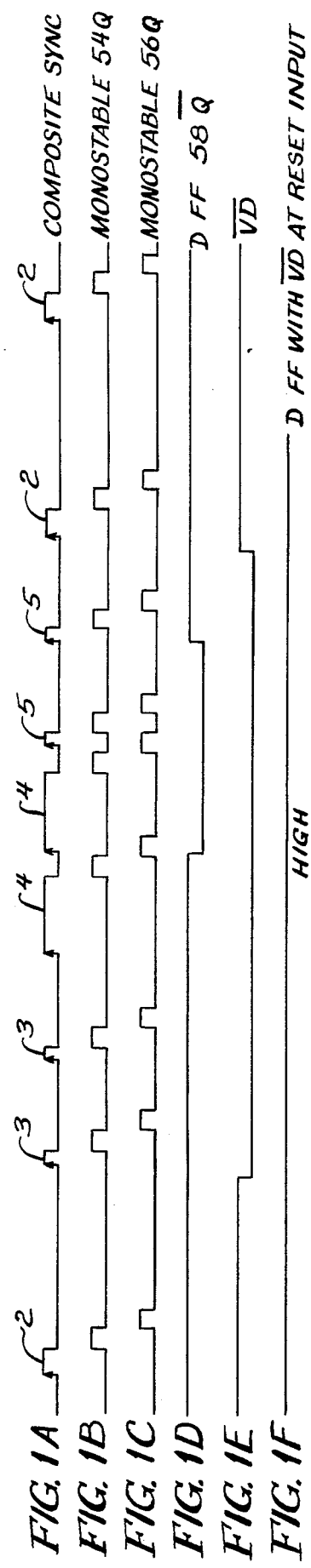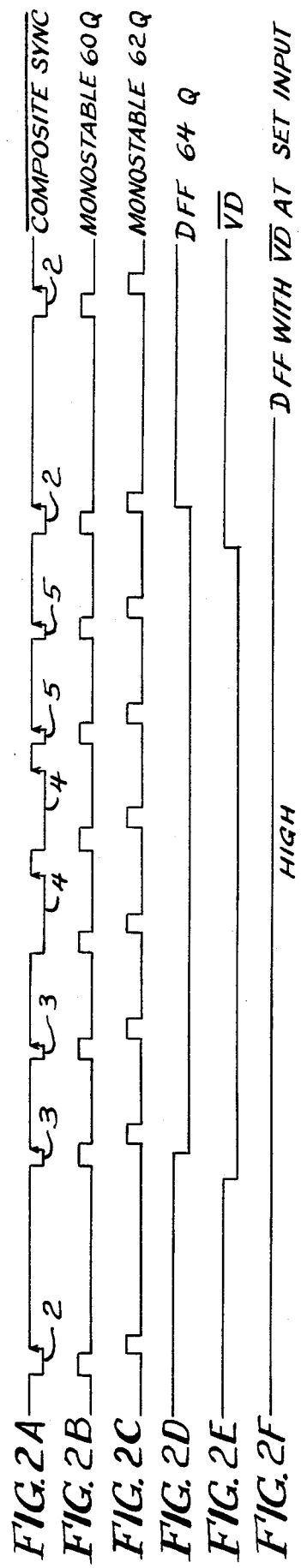

VIDEO NOISE DETECTOR

CROSS-REFERENCE TO RELATED APPLICATION

This application is related to but in no way dependent upon the following application which is assigned to the assignee of the present application and filed in the name of the present inventor: Ser. No. 662,219, filed Oct. 18, 1984, now U.S. Pat. No. 4,535,353, entitled "Vertical Reference Signal Identification System".

BACKGROUND OF THE INVENTION

This invention relates generally to video signal processing and is particularly directed to the detection of noise in a video signal.

A composite video signal is comprised of a video picture signal, a composite sync signal and a blanking signal. The composite sync signal includes horizontal and vertical synchronizing pulses which occur at predetermined horizontal and vertical scan rates and which are interspersed between the scan interval picture component in periods generally referred to as retrace intervals.

The sync signals are susceptible to various types of noise and distortion. Noise superimposed upon the composite video signal can result in excessive sync pulse amplitude variations or the breaking up, or cracking, of individual sync pulses and other undesirable modifications of the composite video signal. Such undesired variations and modifications of the sync portion of the composite video signal make it difficult to reliably recover the sync portion of the composite video signal.

Excessive noise in the composite video signal may thereby render the nondisplay portion, e.g., vertical retrace, of the signal unusable. This portion of the composite video signal is increasingly being used for the transmission of data such as in teletext and cable television (CATV) systems. In these systems, accurate detection of the vertical sync interval is essential for reliable transmission and reception of data included in the composite video signal. Noise superimposed upon the composite video signal can make recovery of data difficult due to an unreliable vertical reference.

OBJECTS OF THE INVENTION

Accordingly, it is a basic object of the present invention to detect excessive noise in a video signal.

It is another object of the present invention to provide an economical and reliable video signal noise detector.

BRIEF DESCRIPTION OF THE DRAWINGS

The appended claims set forth those novel features which characterize the invention. However; the invention itself, as well as further objects and advantages thereof, will best be understood by reference to the following detailed description of a preferred embodiment taken in conjunction with the accompanying drawings, in which:

FIGS. 1A-1F illustrate the timing of signals within the broad pulse detector portion of the video noise detector of the present invention;

FIGS. 2A-2F illustrate the timing of signals within the horizontal sync pulse detector portion of the video noise detector of the present invention.

DETAILED DESCRIPTION OF THE PREFERRED EMBODIMENT

Figure 3:
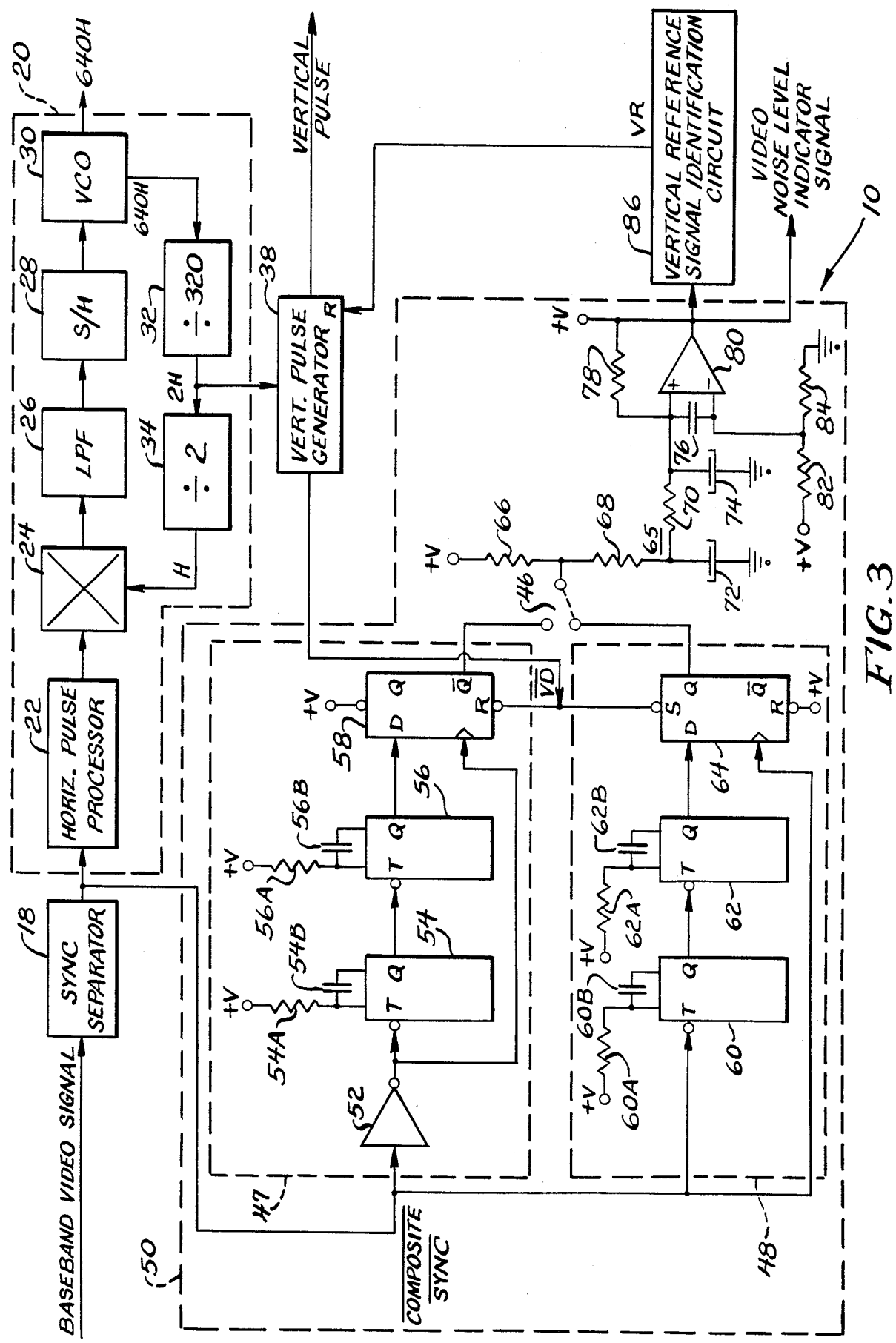
FIG. 3 is a combined schematic and block diagram of a video noise detector in accordance with the present invention.

Referring to FIGS. 1A and 2A, there are shown opposite polarities of the standard NTSC composite sync portion of a video signal. The composite sync signal includes horizontal synchronizing pulses, identified by the number 2, each transmitted with a respective video line for defining horizontal line synchronization of the scanned image. The composite sync signal further includes a vertical blanking interval during which are provided a set of pre-equalizing pulses 3 and a set of broad pulses 4 followed by a set of post-equalizing pulses 5. The pre- and post-equalizing pulses, only two of the normal complement of six each being shown for convenience, occur at twice the line frequency and serve to reduce the effect of line-frequency pulses on the interlaced horizontal scan lines of the scanned image and to coordinate vertical timing for proper interlace. The broad pulses, which also occur at twice the line frequency and which comprise the vertical sync pulse interval, are six in number according to NTSC standards (only two again being shown in the drawing for convenience) and are transmitted at the end of each field for establishing the vertical timing of the scanned image. The broad pulses are also known as the vertical sync pulse. Under excessively noisy conditions, not enough of the horizontal sync pulses of the correct width occur and too many pulses resembling the broad pulses appear outside of the vertical sync pulse interval degrading the integrity of the composite sync signal.

Referring to FIG. 3, there is shown in simplified block and schematic diagram form a video noise detecting system 10 in accordance with the present invention. A baseband video signal is provided to a sync separator 18 for processing in a device such as a CATV encoder. In accordance with the invention, noise detecting system 10 detects the noise level in a received composite video signal. Upon detection of excessive noise, control of the CATV encoder can, for example, be switched to a local stand-by crystal oscillator (not shown). However, the present invention is not limited to this environment as it may be utilized for detecting the presence of excessive noise in various other television signal receiving apparatus.

With further reference to FIG. 3, the baseband video signal is provided to sync separator 18 for removing the composite sync signal from the video signal. The sync separator 18 is generally responsive to the negative-going sync pulses and typically detects the various sync pulses by means of a threshold level detection arrangement set just above the clamped sync tip level. The various components of the composite sync signal such as the horizontal sync pulses and the equalizing and broad pulses are provided from the sync separator 18 to a horizontal phase lock loop (PLL) 20 as well as to a noise detector circuit 50. Details of the noise detector circuit 50 and its processing of the composite sync signal provided thereto are discussed below.

The horizontal PLL 20 includes a horizontal pulse processor 22 which receives the sync pulses from the sync separator 18 and looks at only the first and last ⅛ portions of a horizontal line for a horizontal sync pulse. This reduces the possibility of noise pulses in the middle of a horizontal line causing the horizontal PLL 20 to lock onto an erroneous sync signal. The horizontal pulse processor 22 removes the 2H rate component from the composite sync signal and provides an H rate signal to a phase detector or mixer 24. The 2H rate signal is removed by triggering a monostable multivibrator (not shown) in the horizontal pulse processor 22 where the pulse width of the monostable multivibrator is set for ¾H. The output of the phase detector 24 is provided to a low pass filter (LPF) 26 and thence to a sample and hold (S/H) circuit 28. The output of the S/H circuit 28 is provided to a voltage controlled oscillator (VCO) 30, the output of which is at a 640H rate which is fed back via a divide-by 320 circuit 32 and a divide-by 2 circuit 34 to the phase detector 24.

The LPF 26 filters out the sum frequencies generated in the phase detector 24 by the horizontal rate signals provided thereto. The difference frequencies generated in the phase detector 24 are essentially zero. The phase detector 24 locks onto a leading edge of the horizontal rate signals, with the S/H circuit 28 permitting the error signal of the phase detector during the sync pulse to be stored for an entire horizontal line. The output of the S/H circuit 24 is a control voltage for regulating the frequency of the VCO 30. The VCO output is at 640H which is fed back as the horizontal rate signal H via the aforementioned divide-by 320 and divide-by 2 circuits 32, 34 to the phase detector 24. In this manner, the phase detector 24 provides an output to the LPF 26 according to the difference in frequency and phase between the reference output of the VCO 30 and the horizontal rate signal output from the horizontal pulse processor 22. The horizontal PLL 20 is thus locked in frequency and phase to the leading edge of the composite sync signal. The 640H output signal from the VCO 30 is typically used for generating a horizontal rate signal utilized in the processing of the composite video signal which does not form a part of the present invention and is therefore not discussed further herein.

The 2H output of the divide-by-320 circuit 32 is provided by the horizontal PLL 20 to a vertical pulse generator 38. The vertical pulse generator 38 generates a series of vertical rate pulses synchronized with the broad pulses of the composite video signal by means of a vertical reference signal identification circuit 86. These vertical rate pulses may be used for any number of purposes such as for vertical blanking, generating a data gate, or to specify a particular horizontal line within a field. More particularly, the RESET (R) input of the vertical pulse generator 38 is coupled to the vertical reference signal identification circuit 86 and responsive to vertical timing pulses (VR) output therefrom. The VR pulses provided to the vertical pulse generator 38 ensure synchronization of the vertical rate pulse output from the vertical pulse generator 38 with the vertical sync interval of the incoming composite video signal. The vertical reference signal identification circuit 86 is coupled to the noise detector circuit 50. During excessive noise conditions, the noise detector circuit 50 disables the vertical reference identification circuit 86. The vertical reference circuit 86 may be of conventional circuitry with a preferred embodiment thereof set forth in the aforementioned cross-referenced related application entitled "Vertical Reference Signal Identification System", Ser. No. 662,219, filed Oct. 18, 1984, now U.S. Pat. No. 4,535,353, in the name of the present inventor.

In accordance with the present invention, video noise detector circuit 50 is coupled to the output of the sync separator 18 for detecting noise exceeding a predetermined level in the composite video signal. In detecting the noise level in the composite video signal, the circuit may compare the width of composite sync pulses with a minimum and maximum reference width derived from either the leading or trailing edge of composite sync, and provide an output control signal if the pulse width is not within a predetermined range. Under noisy conditions, the number of horizontal sync pulses having the correct width decreases, while the number of signals resembling the broad pulses occurring outside of the vertical sync pulse interval increases. Either of these situations represents a condition of excessive noise which degrades the integrity of the composite video signal.

The video noise detector circuit 50 includes an inverter 52 to which an inverted composite sync signal is provided. The inverter 52 in combination with first and second negative edge triggered monostable multivibrators 54 and 56 and a D-type flip-flop 58 form a broad pulse detector 47. The output of the sync separator 18 is also provided to the input of a third negative edge triggered monostable multivibrator 60 within the noise detector circuit 50. The third monostable multivibrator 60 in combination with a fourth negative edge triggered monostable multivibrator 62 and a D-type flip-flop 64 form a horizontal sync pulse detector 48. A switch, or jumper 46 permits either the detection of broad pulses or horizontal sync pulses for determining the noise level in the composite video signal. The operation of the noise detector circuit 50 is described in detail in the following paragraphs.

Referring to FIGS. 1A–1F and 2A–2F in combination with FIG. 3, the configuration and operation of the noise detector circuit 50 will now be described. The composite sync signal (FIG. 1A) is provided via inverter 52 to the trigger input of the first monostable multivibrator 54. The first monostable multivibrator 54 times out at 3.13 microseconds after each negative-going transition of the composite sync signal as established by the values of resistor 54A and capacitor 54B coupled thereto. The Q output of the first monostable multivibrator 54 is provided to the trigger input of the second monostable multivibrator 56 which similarly times out after 3.13 microseconds as established by the values of resistor 56A and capacitor 56B. The respective time intervals generated by the first monostable multivibrator 54 and the combination of the first and second monostable multivibrators 54, 56, i.e., 3.13 and 6.26 microseconds, establishes a window within which the noise detector circuit 50 looks for the occurrence of a broad pulse which is 4.7 microseconds in accordance with NTSC standards. In particular, the Q output of the second monostable multivibrator 56 is provided to the D-input of a flip-flop 58, while the output of the inverter 52 is provided to the clock input of the flip-flip 58. Thus, the positive going edges of the composite sync signal are used to sample the output of the second monostable multivibrator 56. The $\overline{Q}$ output of flip-flop 58 will only go LOW in response to a broad pulse as shown in FIG. 1D. Thus, a low $\overline{Q}$ output from the flip-flop 58 corresponds to the detection of a broad pulse having a width of between 3.13 and 6.26 microseconds. The time the $\overline{Q}$ output of flip-flop 58 is low thus represents a measure of the noise level in the composite video signal.

The horizontal sync detector 48 comprised of the third and fourth negative edge triggered monostable multivibrators 60 and 62 in combination with a D-type flip-flop 64 functions in a similar manner and provides a high Q output from the flip-flop 64 in response to the detection of horizontal sync pulses. The 3.13–6.26 microsecond time interval is established by the combination of resistor 60A and capacitor 60B coupled to the third monostable multivibrator 60 and the combination of resistor 62A and capacitor 62B coupled to the fourth monostable multivibrator 62. The difference in operation between the horizontal sync detector 48 and the previously described broad pulse detector 47 is that the former samples the state of monostable multivibrator 62 in response to positive going transitions of the inverted composite sync signal while the latter samples the state of monostable multivibrator 56 in response to positive going transitions of the noninverted composite sync signal. As shown in FIG. 2C, the Q output of the fourth monostable multivibrator 62 is centered on the positive-going edge of the horizontal sync component of the inverted composite sync signal and is provided to the data input of the D-type flip-flop 64. With the inverted horizontal sync pulse provided to the clock input of the flip-flop 64, its Q output will go high when a horizontal sync pulse of between 3.13 and 6.26 microseconds is detected by the noise detector circuit 50.

Therefore, under generally noise-free conditions, the $\overline{Q}$ output of the flip-flop 58 and the Q output of flip-flop 60 will both be predominantly HIGH. If the broad pulse detector 47 determines that, based upon a duty cycle corresponding to the receipt of six broad pulses over three horizontal lines, excessive noise in the form of pulses generated outside of the vertical sync interval is present in the composite video signal, the $\overline{Q}$ output of flip-flop 58 will be LOW more than the nominal amount of time shown in FIG. 1D. Similarly, the Q output of flip-flop 64 will be LOW more than the nominal amount of time shown in FIG. 2D. Either the $\overline{Q}$ output of flip-flop 58 or the Q output of flip-flop 64 may be provided via a switch, or jumper, 46 to a threshold level detection circuit comprised of a low pass filter 65 and a comparator 80. The switch, or jumper, 46 permits either of the synchronization verification signals to be used in determining whether a noisy or clean video signal has been received.

The low pass filter 65 is comprised of resistors 68 and 70 and grounded capacitors 72 and 74. The low pass filter 65 averages the outputs of the broad pulse detector 47 or the horizontal sync detector 48 over several frames of the video signal to provide a DC level representing the ratio of proper to improper broad or horizontal sync pulses. A pull-up resistor 66 couples the outputs of flip-flops 58 and 64 to a +V voltage source so that this output level is not dependent upon the particular TTL device used. A reference voltage level is established by means of a voltage divider network comprised of resistors 82 and 84 and the output of the noise detector circuit 50 is compared with this reference voltage level by means of a comparator 80. Capacitor 76 coupled across the terminals of comparator 80 eliminates comparator oscillation, while feedback resistor 78 coupled across the comparator 80 provides for a small amount of hysteresis to accommodate switching of the comparator 80 as the input provided to its positive terminal approaches the input to its negative terminal. The low pass filtered output of either the broad pulse detector 47 or the horizontal sync detector 48 is provided to the positive terminal of the comparator 80 while the reference voltage level is provided to its negative terminal. When the average level of the low pass filter 65 as detected by either the broad pulse detector 47 or the horizontal sync detector 48 goes below the reference voltage level as established by resistors 82 and 84, indicating that the received signal is characterized either by too few valid horizontal sync pulses or too many pulses resembling broad pulses, the comparator 80 provides a video noise level indicator signal. This signal may in turn be provided to the RESET input of the vertical reference circuit 86 which initializes the vertical pulse generator 38. For example, in a preferred embodiment the output of the low pass filter 65 is approximately 5 volts under low noise conditions. As the signal noise level increases, the output of the low pass filter 65 decreases such that when this input to the comparator 80 goes below 4.3 volts, the comparator output, which had been HIGH, transitions to a LOW state.

The video noise level indicator signal may be used in numerous other ways also. For example, the video noise level indicator signal may represent a blanking signal which is provided to appropriate video blanking circuitry (not shown) for blanking the composite video signal when the noise level therein exceeds a designated threshold value. Also, the video noise level indicator signal may be provided to a visual device such as as light to provide an indication of excessive video noise which could render the position of data relative to the vertical sync interval in the composite video signal unreliable and erroneous.

Without a video input provided to the sync separator 18, it cannot supply clock pulses to the D-type flip-flops 58 and 64 within the broad pulse and horizontal sync detectors 47, 48, respectively. The state of the flip-flops 58 and 64 is dependent upon the state of the last data inputs provided thereto at the moment the video input was removed from the sync separator 18. A vertical drive ($\overline{VD}$) signal is provided by the vertical pulse generator 38 to the RESET input of flip-flop 58 and to the SET input of flip-flop 64 to ensure that the broad pulse and horizontal sync detectors 47, 48 provide high outputs under this condition. This also forces the $\overline{Q}$ output of flip-flop 58 and the Q output of flip-flop 64 to be high during vertical drive. Thus, the noise detector is disabled during vertical drive. It is in this manner that an undetermined output of the video noise detector circuit 50 following the removal of a video input signal is prevented.

There has thus been shown a video noise detector which measures the video noise level in a composite video signal by determining the presence of either excessive pulses resembling broad pulses or insufficient horizontal sync pulses. The video noise detector is particularly adapted for use in a CATV system to allow the transmission of data under excessive video signal noise although it is not limited to that particular environment or application.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for detecting excessive noise in a video signal including a composite signal composed of broad pulses and horizontal sync pulses comprising:
   input means for receiving said video signal;
   sync separation means coupled to said input means for removing the composite sync signal from said video signal;
   pulse width detection means coupled to said sync separation means and responsive to each transition of a first polarity characterizing the composite sync signal for generating a timing window of predetermined length and for generating an output signal in response to the composite sync signal being characterized by successive transitions of a second polarity opposite said first polarity, wherein one of said successive transitions is coincident with one of said timing windows and the other is non-coincident with said timing windows; and
   comparator means coupled to said pulse width detection means for comparing the average level of said output signal with a fixed reference level for generating a control signal representing the noise content of the video signal.

2. The apparatus of claim 1 wherein said pulse width detection means comprises means for selectively generating said output signal wherein said successive transitions are defined by the horizontal sync pulses or the broad pulses of said composite sync signal.

3. The apparatus of claim 2 wherein said pulse width detection means comprises means for generating said output signal wherein said successive transistions are defined by the horizontal sync and broad pulses of said composite sync signal.

4. The apparatus of claim 1 wherein said timing window is in the range of 3.13–6.26 microseconds following said first polarity transitions of the composite sync signal.

5. The apparatus of claim 1 wherein said pulse width detection means includes at least one monostable multivibrator in combination with a flip-flop circuit for generating said timing window.

6. The apparatus of claim 1 wherein said comparator means comprises low pass filter means for averaging said output signal over a plurality of cycles of said composite sync signal.

7. The apparatus of claim 1 further comprising vertical reference signal identification means coupled to said comparator means and responsive to said control signal for resetting said pulse width detection means following the removal of the composite sync signal therefrom.

8. Apparatus for detecting noise in a composite video signal including a composite sync signal comprised of broad pulses and horizontal sync pulses each having a characteristic pulse width, said apparatus comprising:
   input means for receiving said composite video signal;
   sync separation means coupled to said input means for removing said composite sync signal from said composite video signal;
   first pulse width detection means coupled to said sync separation means and responsive to each transition of a first polarity characterizing the composite sync signal for generating a first timing window of predetermined length and for generating a first output signal in response to the composite sync signal being characterized by a first set of successive transitions of a second polarity opposite said first polarity, wherein one of said first set of successive transitions is coincident with one of said first timing windows and the other is non-coincident with said first timing windows;
   means for inverting said composite sync signal;
   second pulse width detection means responsive to each transition of said first polarity characterizing said inverted composite sync signal for generating a second timing window of predetermined length and for generating a second output signal in response to the inverted composite sync signal being characterized by a second set of successive transitions of said second polarity, wherein one of said second set of successive transitions is coincident with one of said second timing windows and the other is non-coincident with said second timing windows;
   switch means coupled to said first and second pulse width detection means for selectively coupling either said first or said second output signals to an output terminal; and
   comparator means coupled to the output terminal of said switch means for establishing an average level of said first or second output signal and for comparing said average level with a reference level for generating a control signal representing the noise content of the composite video signal.

9. The apparatus of claim 8 wherein said first and second timing windows are in the range of 3.13–6.26 microseconds following said first polarity transitions of said composite sync and inverted composite sync signals.

* * * * *